(12) United States Patent
Champion et al.

(10) Patent No.: US 7,291,418 B2
(45) Date of Patent: Nov. 6, 2007

(54) METHODS AND SYSTEMS FOR ELEVATING A TEMPERATURE WITHIN A FUEL CELL

(75) Inventors: David Champion, Lebanon, OR (US); Gregory S Herman, Albany, OR (US); Peter Mardilovich, Corvallis, OR (US); Joseph W Tsang, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 420 days.

(21) Appl. No.: 10/405,252

(22) Filed: Apr. 1, 2003

(65) Prior Publication Data

US 2004/0197623 A1 Oct. 7, 2004

(51) Int. Cl.
*H01M 4/86* (2006.01)
*H01M 8/10* (2006.01)
*H01M 8/04* (2006.01)

(52) U.S. Cl. .............................. 429/41; 429/45; 429/30; 429/44; 429/32; 429/40; 429/26; 429/23

(58) Field of Classification Search .................. None
See application file for complete search history.

(56) References Cited

U.S. PATENT DOCUMENTS

| | | | |
|---|---|---|---|
| 6,103,410 A * | 8/2000 | Fuller et al. .................. 429/13 |
| 6,156,448 A | 12/2000 | Greiner | |
| 6,165,632 A | 12/2000 | Blum et al. | |
| 6,329,089 B1 * | 12/2001 | Roberts et al. ............... 429/13 |
| 6,432,569 B1 | 8/2002 | Zeilinger et al. | |
| 6,784,135 B2 * | 8/2004 | Scholten et al. ............ 502/245 |
| 2004/0033396 A1 * | 2/2004 | Thompson et al. ........... 429/13 |

* cited by examiner

*Primary Examiner*—Patrick Joseph Ryan
*Assistant Examiner*—Angela J. Martin

(57) ABSTRACT

A method for elevating a temperature within a fuel cell having a cathode, an electrolyte and an anode, includes, prior to the electrolyte reaching a minimum temperature at which oxygen ions cross the electrolyte, conducting an exothermic reaction at the cathode or the anode to elevate the temperature within the fuel cell.

9 Claims, 7 Drawing Sheets

METHODS AND SYSTEMS FOR ELEVATING A TEMPERATURE WITHIN A FUEL CELL

BACKGROUND

Over the past century the demand for energy has grown exponentially. With the growing demand for energy, many different energy sources have been explored and developed. One of the primary sources for energy has been, and continues to be, the combustion of hydrocarbons. However, the combustion of hydrocarbons is usually incomplete and releases non-combustibles and other pollutants that contribute to smog in varying amounts. As a result of the pollutants created by the combustion of hydrocarbons, the desire for cleaner energy sources has increased. With the increased interest in cleaner energy sources, fuel cells have become more popular and more sophisticated.

Fuel cells conduct an electrochemical reaction to produce electrical power. The typical fuel cell reactants are a fuel source such as hydrogen or a hydrocarbon, and an oxidant such as air. Fuel cells provide a direct current (DC) that may be used to power motors, lights, or any number of electrical appliances and devices. There are several different types of fuel cells, each using a different electrode, electrolyte and fuel combination.

Fuel cells typically include three basic elements: an anode, a cathode, and an electrolyte. The anode and cathode are electrically isolated by the electrolyte. The electrolyte prohibits the passage of electrons, which results in an electrical current that can be directed to an external circuit. Fuel cells are usually classified by the type of electrolyte which is used, and are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

Some types of fuel cells operate efficiently only at high temperatures or in a high temperature environment. Consequently, there can be a significant time lag before power is produced when the fuel cell is first started and must heat up to the appropriate operating temperature. In order for a fuel cell to replace other electrical power sources, e.g., batteries, in functionality, the fuel cell must be able to start operating rapidly.

As a result, some fuel cells have included some means for heating the cell to allow the cell to more rapidly reach an efficient operating temperature. Several methods of producing the optimal operating temperature have been used in the past, e.g., external catalytic combustors, electrically powered heat sources, etc. However, these solutions also raise further issues with the design and use of the fuel cell. For example, the external catalytic combustor is typically quite large, requires significant startup time, and needs a separate method for the initial heating process, often electrical resistance. Electronic heat sources require significant amounts of power resulting in considerable mass and volume to contain the energy well (battery, capacitor or other) and cause an undesirable thermal expansion to occur between materials.

SUMMARY

A method for elevating a temperature within a fuel cell having a cathode, an electrolyte and an anode, includes, prior to the electrolyte reaching a minimum temperature at which oxygen ions cross the electrolyte, conducting an exothermic reaction at the cathode or the anode to elevate the temperature within the fuel cell.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes methods and systems for allowing a fuel cell to rapidly reach an appropriate operating temperature. By depositing a catalytically active material at the cathode or anode of a fuel cell and inserting an appropriate chemical that results in oxidation at low temperatures, exothermic reactions occur that quickly elevate the temperature within the fuel cell.

While many fuel cells may operate at low temperatures, some fuel cells e.g., a solid oxide fuel cell (SOFC), require higher temperatures in order to function. For example, an SOFC normally operates around 900-1000° Celsius. At such temperatures, the ionic conductivity of the solid oxide electrolyte, i.e., the ease with which certain ions may move within the electrolyte, is increased, allowing transport of oxygen ions from the cathode side to the anode side of the fuel cell.

Figure 1:
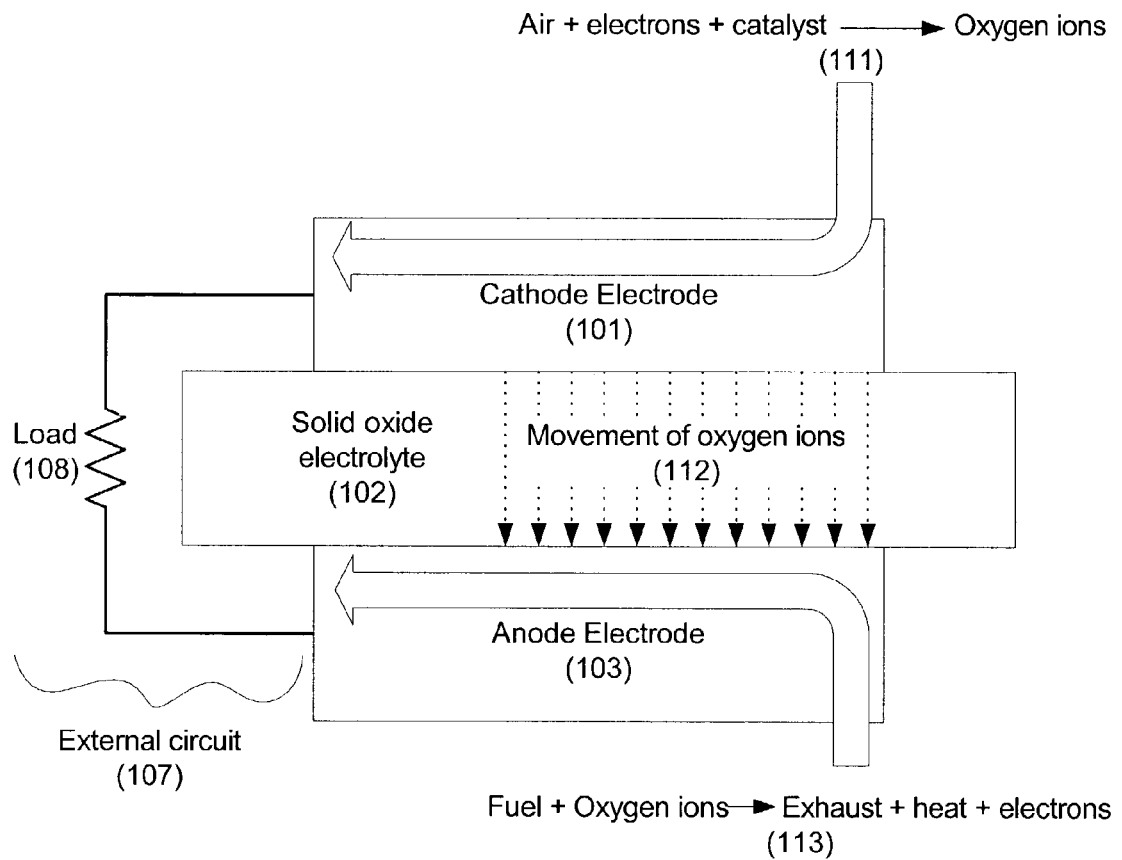
FIG. 1 is a generalized block diagram illustrating the operation of an SOFC.

FIG. 1 is a generalized block diagram illustrating the operation of an SOFC. As shown in FIG. 1, an SOFC may comprise a cathode (101), a solid oxide electrolyte (102), and an anode (103). At the cathode (101), air and electrons combine to create oxygen ions (111). Assuming the solid oxide electrolyte (102) is at normal operating temperatures, oxygen ions are pulled (112) through the electrolyte (102) to the anode (103), where they react with fuels, e.g., $H_2$, CO, etc., to create exhaust, heat, and excess electrons (113).

By using an external circuit (107), the excess electrons created at the anode (103) are free to flow through the circuit (107) to the cathode (101), where the process of creating oxygen ions from air and electrons continues (111). As shown in FIG. 1, an electrical load (108) may be included as part of the external circuit (107). The electrical load (108) may be any power-consuming device and is represented by a resistor in FIG. 1.

As previously explained, a variety of fuel cells, including, SOFC's require minimum operating temperatures in order to function effectively. While many methods may be used to achieve sufficient temperature in a fuel cell, a method described herein uses exothermic, i.e., heat producing, chemical reactions within a fuel cell to elevate temperature to operating levels. As used herein, a "starter fuel" is a fuel input to the anode or cathode of the fuel cell to help elevate the temperature of the fuel cell. A "standard reaction" in a fuel cell is the reaction that occurs during operation of the fuel cell to produce an electrical current. In the standard reaction, oxygen ions are produced at the cathode, move across the electrolyte and react with a fuel at the anode to produce an electrical current. A "cathode reaction" is a reaction that occurs between a starter fuel input to the cathode, oxygen and a catalyst present at the cathode. The cathode reaction is an exothermic reaction that heats the fuel cell. An "anode reaction" is a reaction that occurs between an oxidant input to the anode (not crossing the electrolyte to reach the anode), a fuel, and a catalyst present at the anode. The anode reaction is also an exothermic reaction that heats the fuel cell. The anode reaction may be supported by a starter fuel input to the anode in addition to the regular fuel present at the anode during fuel cell operation. In some embodiments, the anode reaction and cathode reaction may be conducted simultaneously.

Figure 2:
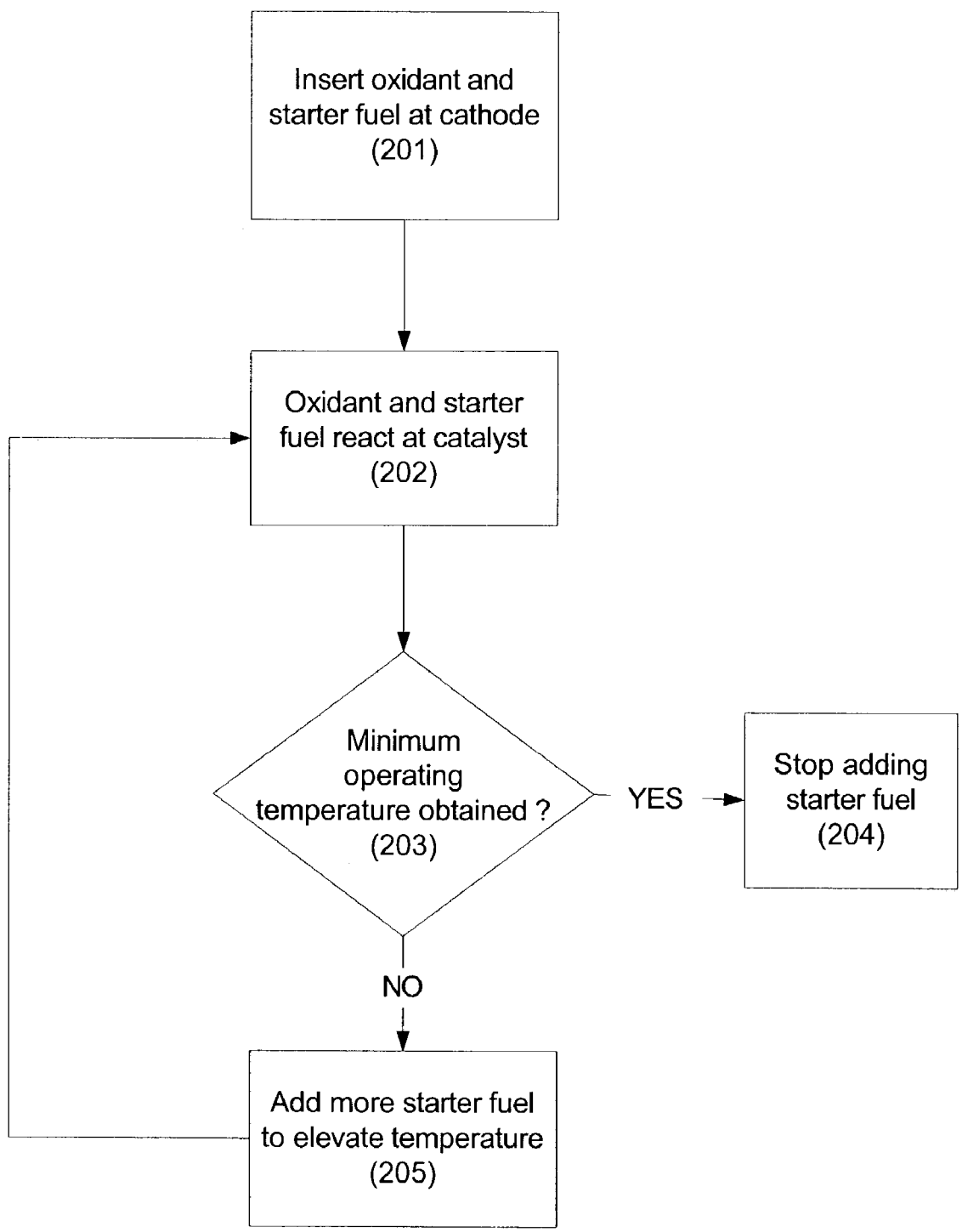
FIG. 2 is a flowchart illustrating a method of elevating temperature in a fuel cell according to one embodiment of the present invention.

FIG. 2 is a flowchart illustrating a method of elevating temperature in a fuel cell. As shown in FIG. 2, a starter fuel and an oxidant are inserted at the cathode side of a fuel cell (step 201), whereby an exothermic cathode reaction occurs. In order to facilitate the cathode reaction, a catalyst may be deposited at the cathode. More specifically, during the fabrication process of a fuel cell, a catalyst may be deposited on top of the cathode electrode, at the cathode electrolyte interface, or within the bulk of the cathode electrode using chemical deposition techniques commonly understood in the art. The catalyst or catalytic material may include, for example, an alloy containing Platinum, Rhodium, Ruthenium, and/or Palladium. In a selected embodiment, platinum deposits may be evenly impregnated over areas of the cathode electrolyte interface.

The catalyst deposits allow the starter fuel to be reformed, i.e., broken down into basic fuel components, or oxidized, thereby setting up an exothermic cathode reaction. This reactive process will be further described with reference to FIG. 3. The exothermic cathode reaction may effectively occur at room temperature using air as an oxidant. Therefore, chemicals that efficiently oxidize at room temperature and may be reformed into common fuel components (carbon monoxide, hydrogen, etc.) can be used as starter fuels. Some examples of such chemicals, include, methanol, formaldehyde, dimethyl ether, ethylene, etc.

In the embodiment of FIG. 2, oxygen ions and starter fuel react (step 202), producing heat and chemical byproducts. If the temperature within the fuel cell is at least a minimum operating temperature (determination 203), i.e., if the ionic conductivity of the electrolyte is high enough for normal operation, the supply of starter fuel may be cut off (step 204). Otherwise, more starter fuel is added to the system (step 205). As shown in FIG. 2, this cycle may repeat. The additional starter fuel reacts with the oxidant in the presence of the catalyst (step 202). The process then re-checks whether the minimum operating temperature has been reached (determination 203). If not, more starter fuel is again added (step 205). In this way, starter fuel is supplied until the minimum operating temperature is reached or to help maintain the minimum operating temperature.

The process illustrated in FIG. 2 may be implemented at the "startup" of a fuel cell, or whenever the temperature within the fuel cell is below a minimum operating temperature. For example, if during normal operation the power and fuel demands from an electrical load are so low that a standard reaction of oxygen ions with a fuel (as illustrated at the anode of FIG. 1) does not maintain a minimum operating temperature (determination 203), more starter fuel may be added to the fuel cell. As explained above, the addition of starter fuel and an oxidant to a cathode (with catalyst) effectively increases the temperature of a fuel cell to appropriate operating levels.

Figure 3:
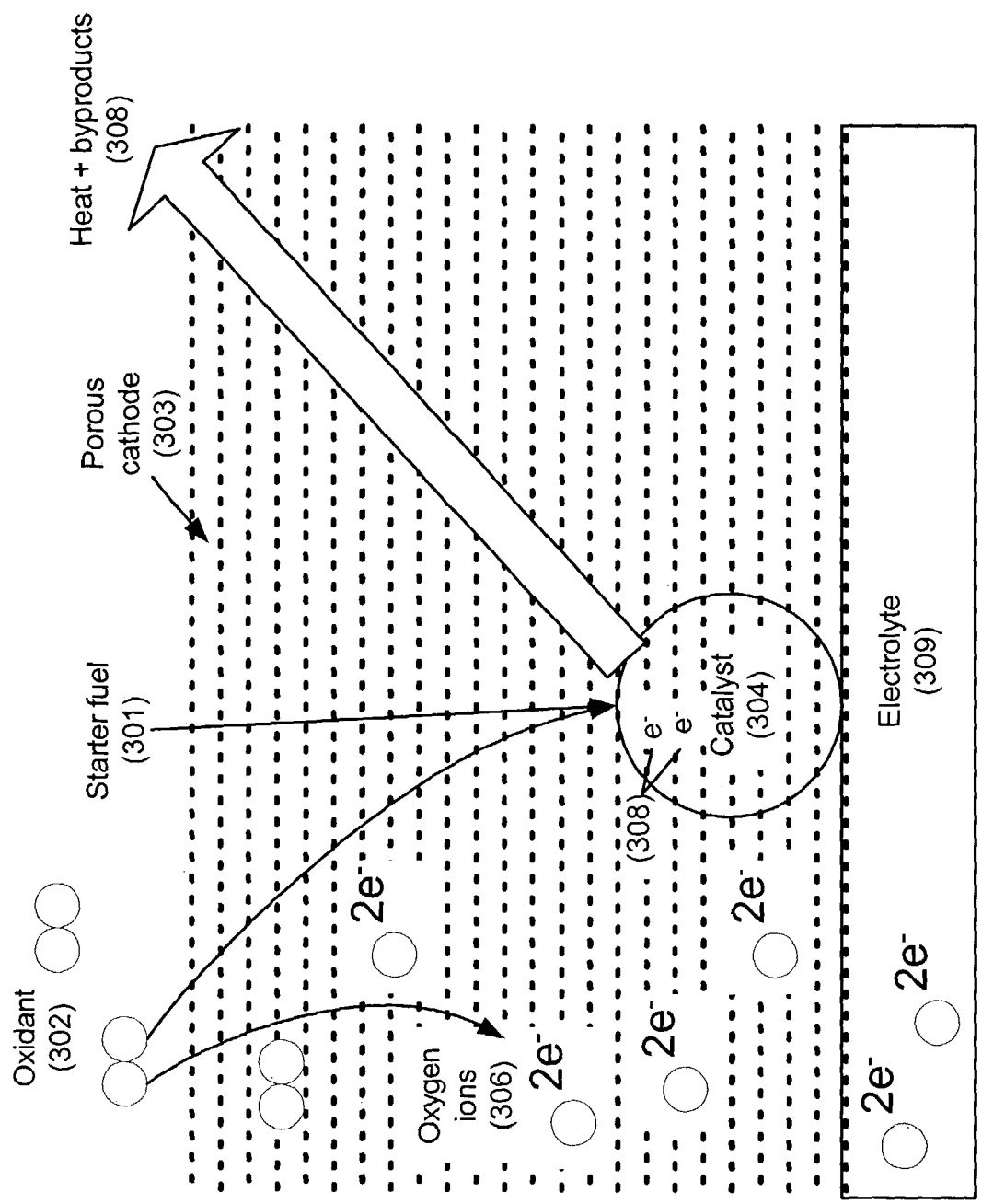
FIG. 3 is a block diagram illustrating the workings of a temperature raising reaction in a fuel cell according to one embodiment of the present invention.

FIG. 3 is a block diagram illustrating the workings of an exothermic cathode reaction in a fuel cell. As shown in FIG. 3, starter fuel (301) and oxidant (302) may be introduced at a porous cathode (303) of a fuel cell. By allowing the starter fuel (301) and oxidant (302) to meet in contact with a catalyst (304), the starter fuel (301) is directly oxidized, producing excess heat and byproducts (308).

The starter fuel (301) may be input directly into the fuel cell and consumed directly through oxidation at the highly active catalyst site (304) or it may be first partially reformed by the cathode (303) and then oxidized at the highly active catalyst site (304) or partially oxidized at the cathode (303) and then finally oxidized at the highly active catalyst (304). The same process of forming then combining reformed starter fuel (301) and oxidant (302) continues, thereby producing sufficient heat to surpass a minimum operating temperature for the fuel cell.

Methanol (CH$_3$OH) may be used as a starter fuel (301) and air may be used as an oxidant (302). By placing a catalyst (304), e.g., platinum, at the cathode-electrolyte interface, the methanol reacts with the catalysts (304) and oxidant (302) following one of several possible reactions:

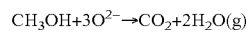

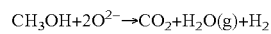

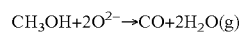

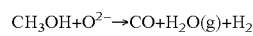

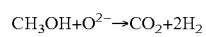

In this releases byproducts (CO$_2$ and H$_2$O), heat, and electrons (308). Alternatively, other starter fuels (301) and oxidants (302) may be used to cause a heat producing reaction within a fuel cell. At sufficient temperatures, the ionic conductivity of the electrolyte (309) allows oxygen ions (306) at the cathode electrolyte interface to be "pulled" to the anode side of a fuel cell to initiate the standard reaction of the fuel cell.

Figure 4:
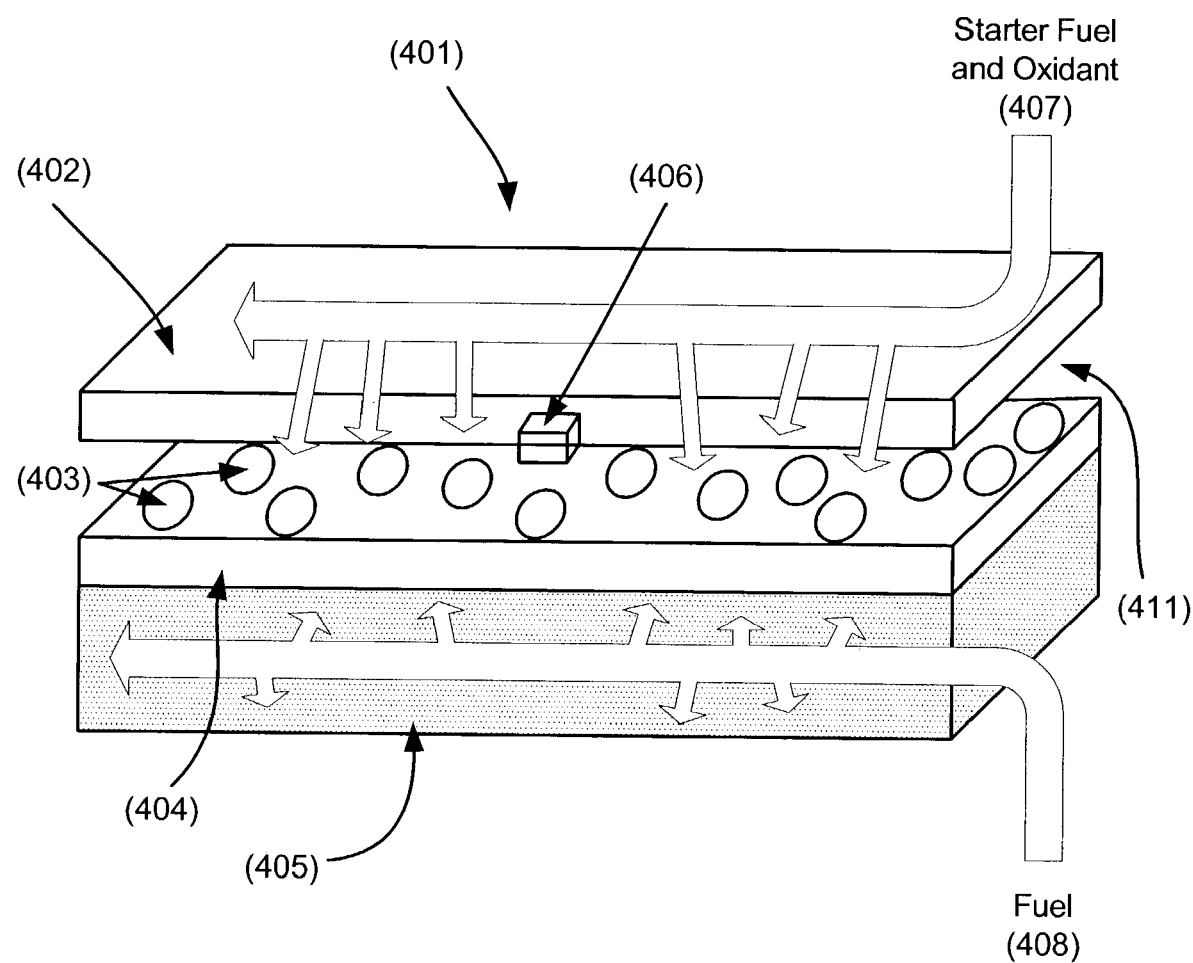
FIG. 4 is a block diagram illustrating a fuel cell according to one embodiment of the present invention.

FIG. 4 is a block diagram illustrating a fuel cell according to principles described herein. As shown in FIG. 4, the fuel cell (401) may comprise a cathode (402), highly-active catalytic material (403), a thin electrolyte layer (404), an anode (405), and a heat sensor (406).

The cathode (402) is made of a porous material which allows gases, e.g., starter fuel, air, etc., to pass through to a cathode chamber (411) and allows unreactive chemicals created during reactions at the cathode side to exit the fuel cell (401). The cathode chamber (411) refers to an area at the cathode electrolyte interface into which starter fuel and an oxidant (407) are introduced during operation of the fuel cell (401). In reality, there is no space between the cathode (402), catalytic material (403), and thin electrolyte layer (404). The space shown in FIG. 4 is for illustrative purposes only.

In operation, the catalytic material (403), e.g., platinum, reacts with a starter fuel and oxidant (407) as previously described with reference to FIG. 3. This reaction elevates the temperature at the cathode chamber (411) sufficiently to allow a fuel cell to efficiently operate. More specifically, by achieving a minimum operating temperature within the fuel cell (401), excess oxygen molecules at the cathode side are converted into oxygen ions and the ionic conductivity of the electrolyte (404) increases, allowing normal fuel cell operation as currently understood in the art.

In the illustrated embodiment, the catalytic material (403) is evenly distributed over the area of the cathode (402) and provides uniform heating in the cathode chamber (411). Additionally, the catalytic material (403) may not cover the entire electrolyte membrane (404), thus limiting the flow of elements, e.g., oxygen ions, across the electrolyte layer (404) to the anode (405).

The electrolyte layer (404) provides a barrier (preventing gases and electricity from flowing) between the cathode (402) and anode (405), but at sufficient temperatures allows oxygen ions in the cathode chamber (411) to diffuse though and react with fuel at the anode (405). The anode (405) may be a porous material that allows gas to travel through the material. More specifically, the anode (405) may contain materials, e.g., nickel, palladium, platinum, etc., and alloys thereof which react with an anode-side fuel, e.g., hydrogen, hydrogen bearing gases, hydrocarbon fuels, etc. that provide oxidizable fuels at the anode (405).

The heat sensor (406) may be used to detect when the minimum or optimal operating temperature for a fuel cell (401) has been reached. Additionally, the heat sensor (406) may be used in conjunction with external devices that control the flow of the fuel, e.g., starter fuel, anode-side fuel, etc., to the fuel cell (401). For example, if the minimum operating temperature of a fuel cell (401) has been reached, the heat sensor (406) may send a signal to one or more external devices, whereby the flow of starter fuel, e.g., methanol, to the cathode may be discontinued. Additionally, the heat sensor (406) may also be used in conjunction with one or more external devices to add starter fuel to a fuel cell (401) when the temperature of a fuel cell drops below a minimum temperature during active operation.

For example, if the power needed by an electrical load does not allow a fuel cell (401) to maintain a minimum operating temperature, the heat sensor (406) may send a signal to a methanol providing device, whereby additional methanol or other starter fuel is input into the cathode chamber (411) in order to elevate and maintain the temperature at a minimum or optimal operating temperature.

Figure 5:
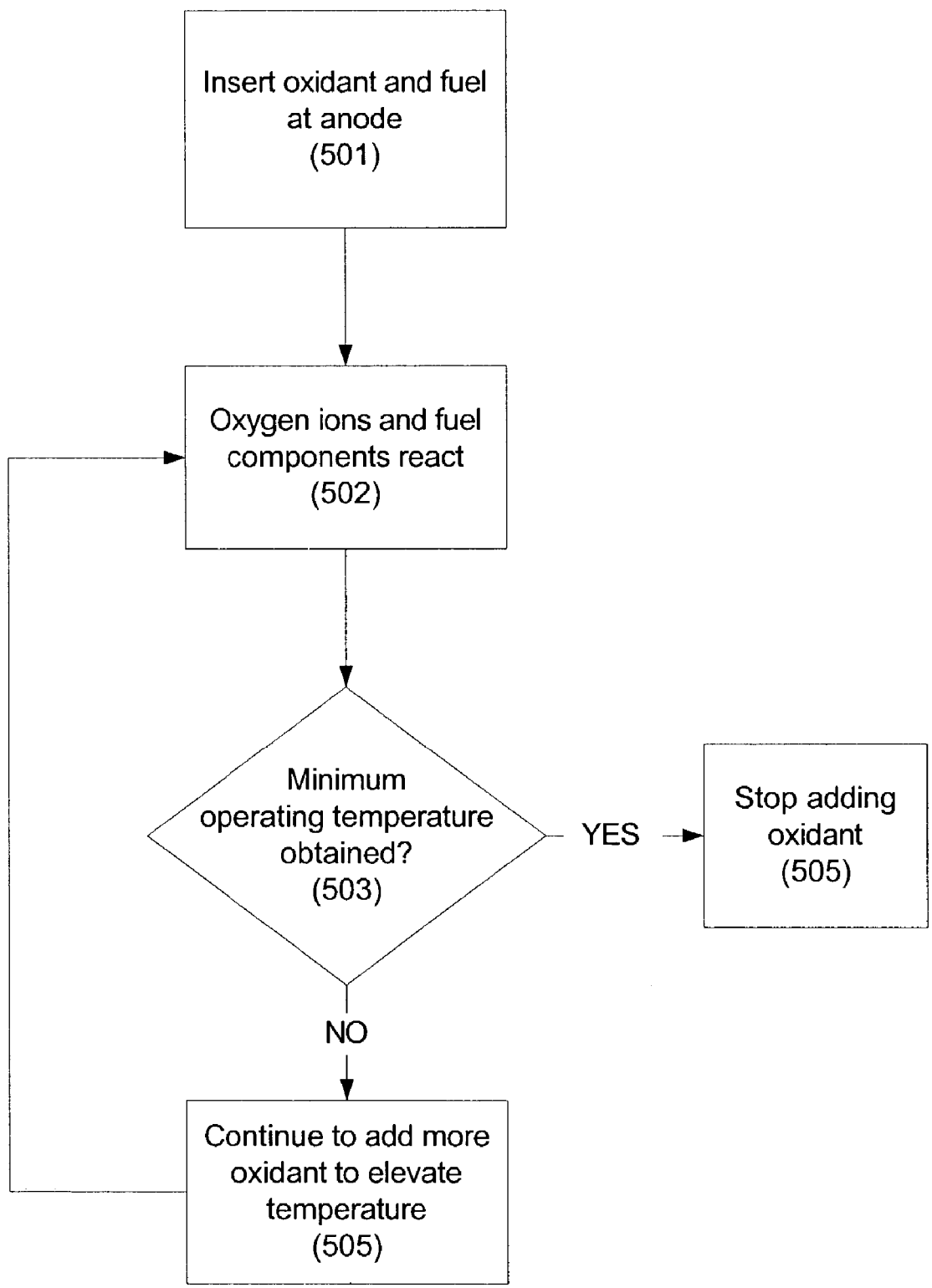
FIG. 5 is a block diagram illustrating a method of elevating temperature in a fuel cell according to another embodiment of the present invention.

FIG. 5 is a flowchart illustrating another method of elevating temperature in a fuel cell. As shown in FIG. 5, an oxidant and a fuel are inserted at the anode side of a fuel cell (step 501), whereby an exothermic anode reaction, i.e., a heat-producing reaction, occurs (step 502). In order to facilitate the exothermic anode reaction, a catalyst may be deposited at the anode. More specifically, during the fabrication process of a fuel cell, a catalyst may be deposited on top of the anode electrode, at the anode electrolyte interface, or within the bulk of the anode electrode using chemical deposition techniques commonly understood in the art. In some embodiments, platinum deposits may be evenly impregnated over areas of the anode electrolyte interface.

The catalyst deposits allow the fuel to be oxidized at low temperatures, thereby producing the desired exothermic anode reaction (step 502). This reactive process is similar to that described with reference to FIG. 3, except the location of the reaction is at the anode side of the fuel cell. The exothermic anode reaction may effectively occur at room temperature. Additionally, a starter fuel as described previously may be used at the anode side of a fuel cell (in combination with or in place of the anode-side fuel mentioned above).

In the standard fuel cell reaction, oxygen ions crossing the electrolyte from the cathode react with fuel at the anode to produce electrons that then flow as an electrical current produced by the fuel cell. However, if the temperature of the electrolyte is too low, the oxygen ions from the cathode cannot cross to the anode. In this circumstance, as shown in FIG. 5, an oxidant is added or inserted to the anode with the fuel (step 501). This additional oxidant and fuel components present at the anode react (step 502), releasing heat, electrons, and chemical byproducts. If the temperature within the fuel cell is at least a minimum operating temperature (determination 503), i.e., if the ionic conductivity of the electrolyte becomes high enough to support allow the transport of oxygen ions from the cathode, the supply of oxidant is preferably cut off (step 504). Otherwise, more oxidant is added to the system (step 505). As shown in FIG. 5, this cycle may repeat. The additional oxidant reacts with the fuel (step 502) in the presence of the catalyst. The process then re-checks whether the minimum operating temperature has been reached (determination 503). If not, more oxidant is again added (step 505). In this way, oxidant is supplied until the minimum operating temperature is reached or to help maintain the minimum operating temperature.

Other embodiments may include adding a starter fuel and oxidant at the anode side (similar to the process described with reference FIG. 3). In such embodiments, the supply of starter fuel and the oxidant may be carefully controlled to increase the temperature of a fuel cell, but then allow normal fuel cell operation once a minimum operating temperature has been reached. Additionally, an oxidant may be added at the cathode of the fuel cell to allow normal operation of a fuel cell (as described with reference to FIG. 1) once a minimum operating temperature has been reached.

The process illustrated in FIG. 5 may be implemented at the "startup" of a fuel cell, or whenever the temperature within the fuel cell is below a minimum operating temperature. For example, if during normal operation the power and fuel demands from an electrical load are so low that a standard reaction of oxygen ions with a fuel (as described for FIG. 1) does not maintain a minimum operating temperature (determination 503), more oxidant may be added to the fuel cell (step 505). As explained above, the addition of an oxidant in the presence of fuel components and a catalyst may effectively increase the temperature of the fuel cell to appropriate operating levels.

In using the process of FIG. 5, care should be taken not to oxidize the catalyst deposits present at the anode. The oxidation of the catalyst may occur if too much oxygen is present, but can be prevented by carefully controlling the amount of oxidant inserted into the anode. Additionally, the presence of an oxidant at the anode may prevent the normal operation of a fuel cell (as described in FIG. 1) from occurring. Therefore, it is necessary to carefully control the quantity and timing of oxidant insertion at the anode.

Figure 6:
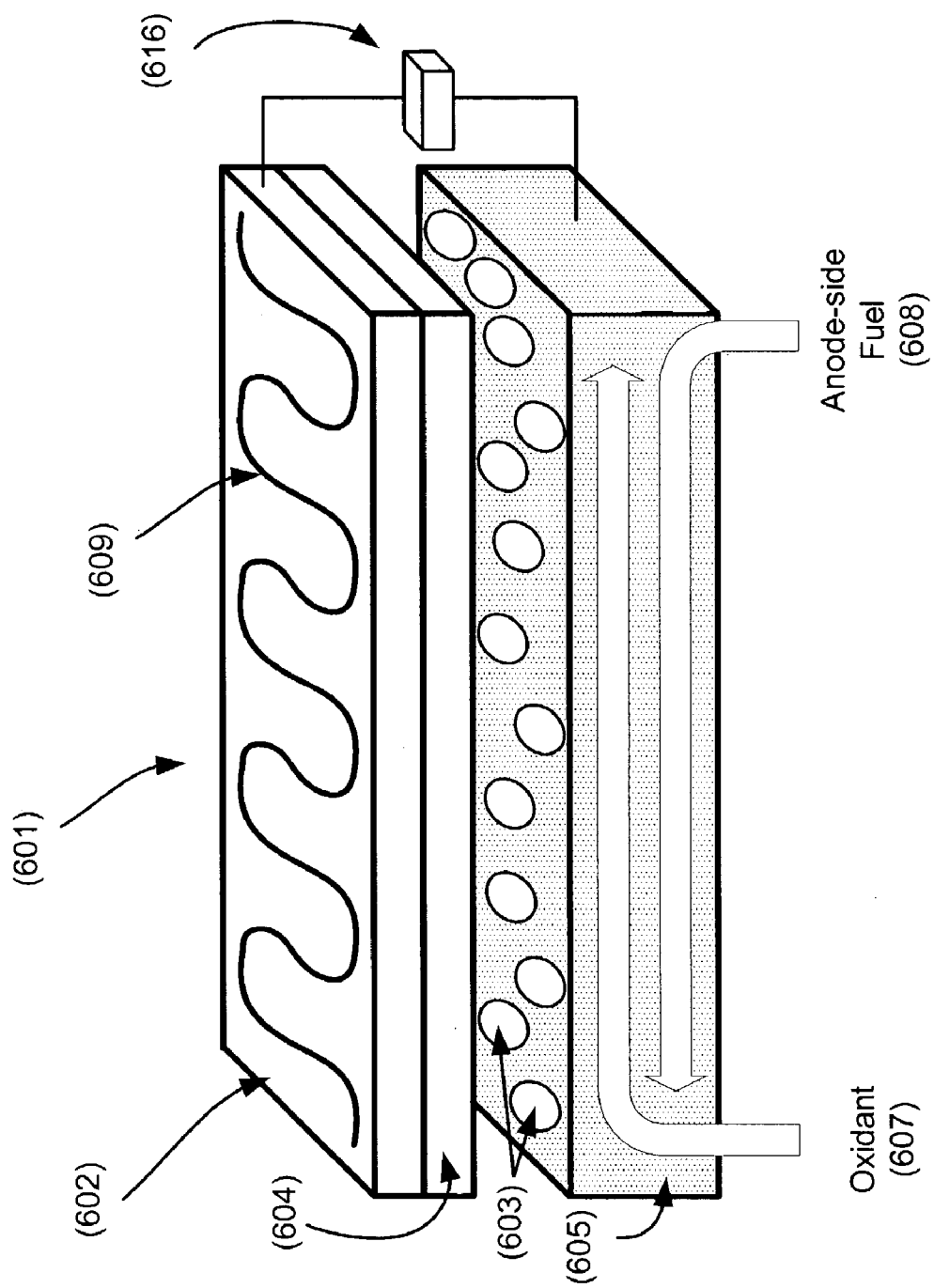
FIG. 6 is a block diagram illustrating a fuel cell according to another embodiment of the present invention.

FIG. 6 is a block diagram illustrating a fuel cell according to principles described herein. As shown in FIG. 6, a fuel cell (601) may comprise a cathode (602), a thin electrolyte layer (604), an anode (605), a highly-active catalytic material (603) at the anode (605), a heating element (609), and an electrical current sensor (616). The catalytic material (603) may include, for example, platinum.

As shown, FIG. 6 illustrates a fuel cell (601) that may carry out the process of FIG. 5. Additionally, the fuel cell (601) may be equipped with a heating element (609) and an electrical current sensor (616). As described for FIG. 5, it is desirable to insert fuel (608) and an oxidant (607) at the anode (605) in order to cause an anode reaction that will elevate the fuel cell temperature from approximately room temperature to higher than a minimum operating temperature.

As explained above, the addition of an oxidant (607) and fuel (608) in the presence of a catalyst (603) at the anode (605) causes an exothermic anode reaction, thereby releasing byproducts, electrons, and heat. This process may be used to elevate temperature within a fuel cell above a minimum operating temperature as previously described. The addition of oxidant (607) may be carefully controlled, thus preventing the catalyst deposits from oxidizing. Additionally, a starter fuel may be used at the anode (605) in combination with or in place of the anode-side fuel (608) in order to carry out the process described for FIG. 5.

In some embodiments, the supply of a starter fuel may be discontinued once a minimum operating temperature has been reached, while the supply of anode-side fuel (608) is required for normal fuel cell operation, i.e., the standard reaction. Also, an oxidant (607) is required at the cathode for normal fuel cell operation (as described for FIG. 1).

In some embodiments, the exothermic anode and cathode reactions may be conducted simultaneously to more rapidly bring the fuel cell to the minimum operating temperature. In order to effectively heat a fuel cell using an exothermic cathode or anode reaction (as described for FIG. 2 and FIG. 5), the chemicals involved initially need to be at a minimum "startup" temperature. For example, the reactive process described in FIG. 3, will not effectively occur unless the initial temperature of the chemicals involved is approximately at or above 20° Celsius. The minimum startup temperature may be achieved by using the fuel cell at approximately room temperature (22° Celsius). Otherwise, if a fuel cell is to be used in locations where the ambient temperature is below a minimum startup temperature, a device, such as a heating element (609) may be used to elevate the temperature of the startup chemicals to a minimum startup temperature.

As shown in FIG. 6, a heating element (609) may be placed on the cathode side of a fuel cell (601). Alternatively, the heating element (609) may be placed on the anode side, or another appropriate location of a fuel cell (601). The heating element (609) may be used to elevate the temperature of startup chemicals to a minimum startup temperature, but is not active at higher temperatures, i.e., the heating element (609) may be turned off once the desired exothermic reactions (described for FIG. 3) begin to occur. As used herein, "startup chemicals" includes starter fuel to be input to the cathode or anode of the fuel cell and an oxidant to be input to the cathode of the fuel cell.

The function of the electrical current sensor (616) is similar to the function of the heat sensor (406, FIG. 4) described for FIG. 4. As shown in FIG. 6, an electrical current sensor (616) may be connected between the cathode (602) and anode (605) of a fuel cell (601) to detect the flow of electrons. By measuring the flow of electrons from the anode to the cathode, the electrical current sensor (616) may function with other external devices to manage the operating temperature, the electrical output of the fuel cell (601), or other functions. For example, if the electrical current sensor (616) determines the output current of a fuel cell (601) is low, it may function with external devices that control the flow of startup fuel, oxidant, fuel, etc. Examples of such external devices include fuel cartridges containing methanol, hydrogen, hydrocarbon fuel, etc.

Figure 7:
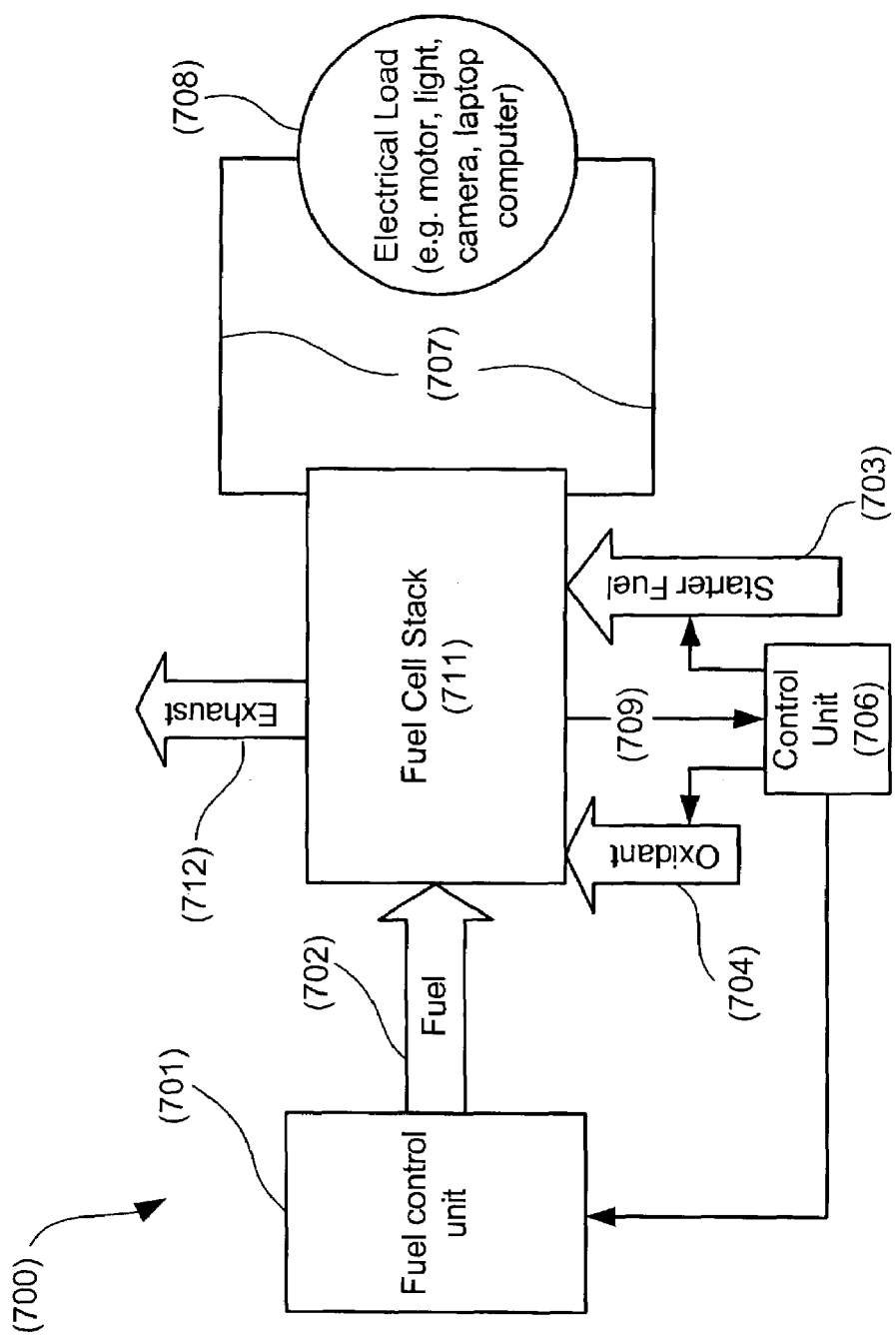
FIG. 7 is a block diagram illustrating a system in which a fuel cell according to one embodiment of the present invention may be used.

FIG. 7 is a block diagram illustrating a system in which a fuel cell, constructed according to principles described herein, may be used. As shown in FIG. 7, the system (700) may comprise a fuel control unit (701), a fuel cell stack (711), a control unit (706), and an electrical load (708). The fuel cells shown in FIGS. 4 and FIG. 6 may be used in the fuel cell stack (711), containing one or more fuel cells, of FIG. 7. Similarly, the external devices described above in connection with FIGS. 4 and 6 may include the control unit (706) of FIG. 7. Additionally, other fuel cells different from the embodiments shown herein may also be used.

In operation, the fuel control unit (701) provides a supply of fuel (702), e.g., hydrogen, hydrocarbon fuel, etc., to the fuel cell stack (711). Additionally, a supply of oxidant (704) and starter fuel (703) is provided to the fuel cell stack (711). In one embodiment (corresponding to FIG. 2), the starter fuel (703) may be methanol and the oxidant (704) may be air. In another embodiment (corresponding to FIG. 5), where the low temperature catalytic reactions take place at the anode, the fuel cell starting mechanism may be oxidant (704) and fuel (702).

Alternatively, other combinations of starter fuels (703), oxidants (704), etc., may be used and inserted at the cathode side or anode side of a fuel cell to cause an exothermic reaction for purposes of reaching a fuel cell's operating temperature as previously described. During startup and normal operation, exhaust (712), consisting of chemical byproducts, is released from the fuel cell stack (711).

As shown in FIG. 7, a control unit (706) may be used to receive data (709), e.g., temperature, output power information, etc., from the fuel cell stack (711) and enable or disable the flow of starter fuel (703), oxidant (704), or fuel (702) as previously described. The starter fuel (703), oxidant, (704), and fuel (702), may be provided in fuel cartridge, which are commonly used in the art. Such fuel cartridges may control the flow of starter fuel (703) according to signals sent by the control unit.

Once the operating temperature of the fuel cell stack (711) is sufficiently high, electricity may effectively be produced and provided to an electrical load (708), as described for FIG. 1, through electrical conductors (707). The electrical load (708) may electrically operated device including, but not limited to: an automobile motor (and other automotive electricals), a light, a camera, a home auxillary power unit, a computer, or other devices consuming electricity.

The proceeding description has been presented only to illustrate and describe embodiments of invention. It is not intended to be exhaustive of to limit the invention to any precise form disclosed. Many modification and variations are possible in light of the above teaching. It is intended that the scope of the invention be defined by the following claims.

What is claimed is:

1. A method of elevating a temperature within a fuel cell, said method comprising;
    providing catalytic material at an anode side of said fuel cell;
    inputting a fuel to said anode side; and
    inputting an oxidant to said anode side, wherein an exothermic reaction occurs at said anode side of said fuel cell;
    providing a catalytic material at a cathode side of said fuel cell;
    inputting an oxidant to said cathode side; and
    inputting a starter fuel to said cathode side, wherein an additional exothermic reaction occurs at said cathode side of said fuel cell.

2. The method of claim 1 further comprising inserting a starter fuel to said anode side.

3. The method of claim 1, wherein said fuel comprises a hydrogen-based fuel used for normal operation of said fuel cell.

4. The method of claim 1, further comprising monitoring the temperature within said fuel cell to determine when to input said oxidant to said anode side.

5. The method of claim 4, wherein said oxidant is input whenever said temperature is below a minimum operating temperature.

6. The method of claim 1, wherein said providing catalytic material at an anode side of said fuel cell comprises depositing said catalytic material on the anode.

7. The method of claim 1, wherein said providing catalytic material at an anode side of said fuel cell comprises depositing said catalytic material throughout the anode.

8. The method of claim 1, wherein said providing catalytic material at an anode side of said fuel cell comprises depositing said catalytic material at an anode/electrolyte interface.

9. The method of claim 1, wherein said catalytic material comprises Platinum.

* * * * *

UNITED STATES PATENT AND TRADEMARK OFFICE
CERTIFICATE OF CORRECTION

PATENT NO. : 7,291,418 B2
APPLICATION NO. : 10/405252
DATED : November 6, 2007
INVENTOR(S) : David Champion et al.

It is certified that error appears in the above-identified patent and that said Letters Patent is hereby corrected as shown below:

In column 8, line 37, after "unit" insert -- (706) --.

In column 8, line 42, after "may" insert -- include any --.

In column 8, line 44, delete "electricals" and insert -- electronics --, therefor.

In column 8, line 46, delete "proceeding" and insert -- preceding --, therefor.

In column 8, line 48, delete "of" and insert -- or --, therefor.

In column 8, line 55, in Claim 1, after "comprising" delete ";" and insert -- : --, therefor.

Signed and Sealed this

Fourteenth Day of April, 2009

JOHN DOLL
*Acting Director of the United States Patent and Trademark Office*